(12) United States Patent
Nakamura et al.

(10) Patent No.: US 10,031,496 B2
(45) Date of Patent: Jul. 24, 2018

(54) CONTROL SYSTEM, CONTROL APPARATUS, INFORMATION EQUIPMENT, AND CONTROL METHOD

(71) Applicant: KYOCERA Corporation, Kyoto-shi, Kyoto (JP)

(72) Inventors: Kazutaka Nakamura, Yokohama (JP); Takashi Inoue, Zama (JP); Daisuke Hoshi, Sakura (JP)

(73) Assignee: KYOCERA Corporation, Kyoto (JP)

( * ) Notice: Subject to any disclaimer, the term of this patent is extended or adjusted under 35 U.S.C. 154(b) by 339 days.

(21) Appl. No.: 14/784,022

(22) PCT Filed: Apr. 8, 2014

(86) PCT No.: PCT/JP2014/060210
§ 371 (c)(1),
(2) Date: Oct. 12, 2015

(87) PCT Pub. No.: WO2014/168151
PCT Pub. Date: Oct. 16, 2014

(65) Prior Publication Data
US 2016/0048115 A1   Feb. 18, 2016

(30) Foreign Application Priority Data
Apr. 12, 2013   (JP) .................. 2013-084414

(51) Int. Cl.
*G05B 15/02* (2006.01)
*H04L 12/707* (2013.01)
(Continued)

(52) U.S. Cl.
CPC .............. *G05B 15/02* (2013.01); *H04L 1/08* (2013.01); *H04L 12/2829* (2013.01); *H04L 41/0833* (2013.01); *H04L 45/22* (2013.01)

(58) Field of Classification Search
CPC ....... G05B 15/02; H04L 1/08; H04L 12/2829; H04L 41/0833; H04L 45/22
See application file for complete search history.

(56) References Cited

U.S. PATENT DOCUMENTS 6,470,385 B1 * 10/2002 Nakashima ......... H04L 43/0817
370/390
6,697,618 B1 * 2/2004 Bullock ................ H04M 1/725
455/425

(Continued)

FOREIGN PATENT DOCUMENTS

JP   06-006871 A   1/1994
JP   2008-124960 A   5/2008
(Continued)

OTHER PUBLICATIONS

International Search Report dated Jul. 8, 2014 issued for International Application No. PCT/JP2014/060210.
(Continued)

*Primary Examiner* — Mark A Connolly
(74) *Attorney, Agent, or Firm* — Procopio Cory Hargreaves and Savitch LLP

(57) ABSTRACT

Control system 100 comprises information equipment 300 located in a consumer's facility and a HEMS 200 controlling the information equipment 300 via a narrow area network 70. The HEMS 200 includes a transmission unit 320 which repetitively transmits to the information equipment 300 an operational instruction of instructing an operation of the information equipment 300 until transmission of an instruction different from the operational instruction is determined.

16 Claims, 8 Drawing Sheets

(51) Int. Cl.
    *H04L 12/28*         (2006.01)
    *H04L 1/08*          (2006.01)
    *H04L 12/24*         (2006.01)

(56) References Cited

U.S. PATENT DOCUMENTS

| | | | | |
|---|---|---|---|---|
| 8,295,949 | B2* | 10/2012 | Akita | G05B 19/4142 |
| | | | | 700/3 |
| 8,490,006 | B1 | 7/2013 | Reeser et al. | |
| 9,282,537 | B2* | 3/2016 | Gerrish | H04W 4/22 |
| 9,469,126 | B2* | 10/2016 | Willems | B41J 11/002 |
| 9,775,220 | B2* | 9/2017 | Shira | H05B 37/0272 |
| 2005/0168658 | A1* | 8/2005 | Woolgar | G08C 17/02 |
| | | | | 348/734 |
| 2008/0147212 | A1 | 6/2008 | Monma et al. | |
| 2009/0239587 | A1* | 9/2009 | Negron | G06F 3/04883 |
| | | | | 455/566 |
| 2009/0262001 | A1 | 10/2009 | Haga et al. | |
| 2010/0305789 | A1* | 12/2010 | Ito | B63H 21/213 |
| | | | | 701/21 |
| 2011/0118879 | A1* | 5/2011 | Bauer | A61G 12/002 |
| | | | | 700/275 |

FOREIGN PATENT DOCUMENTS

| | | |
|---|---|---|
| JP | 2008-152343 A | 7/2008 |
| JP | 2010-128810 A | 6/2010 |

OTHER PUBLICATIONS

Extended European Search Report dated Sep. 26, 2016 issued by the European Patent Office in counterpart European Patent Application No. 14 78 2724.

* cited by examiner

FIG. 6

SET COMMAND (A) | HEADER | OPERATIONAL INSTRUCTION |

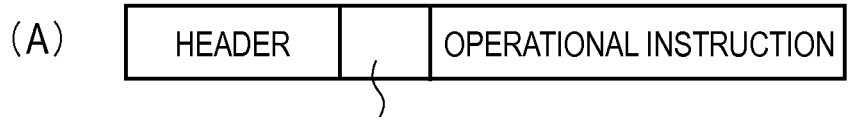

OPERATION-ROUTE SPECIFYING INFORMATION

SET RESPONSE COMMAND (B) | HEADER | SET RESPONSE |

OPERATION-ROUTE IDENTIFIER

FIG. 7

GET COMMAND (A) | HEADER | DEMAND TO REFER TO INFORMATION |

OPERATION-ROUTE SPECIFYING INFORMATION

GET RESPONSE COMMAND (B) | HEADER | STATE INFORMATION |

OPERATION-ROUTE IDENTIFIER

FIG. 8

INFO COMMAND

| HEADER | STATE INFORMATION |

OPERATION-ROUTE IDENTIFIER

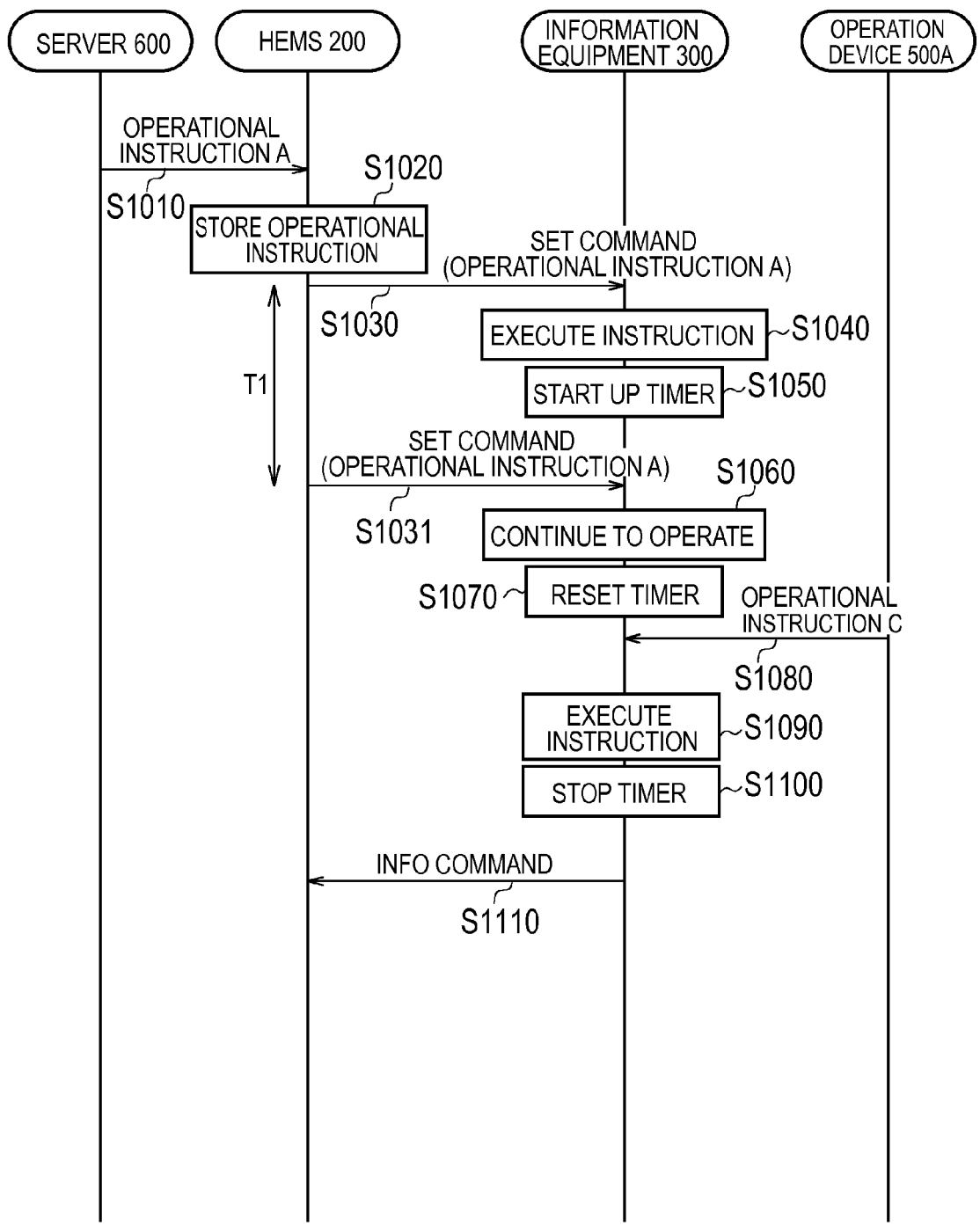

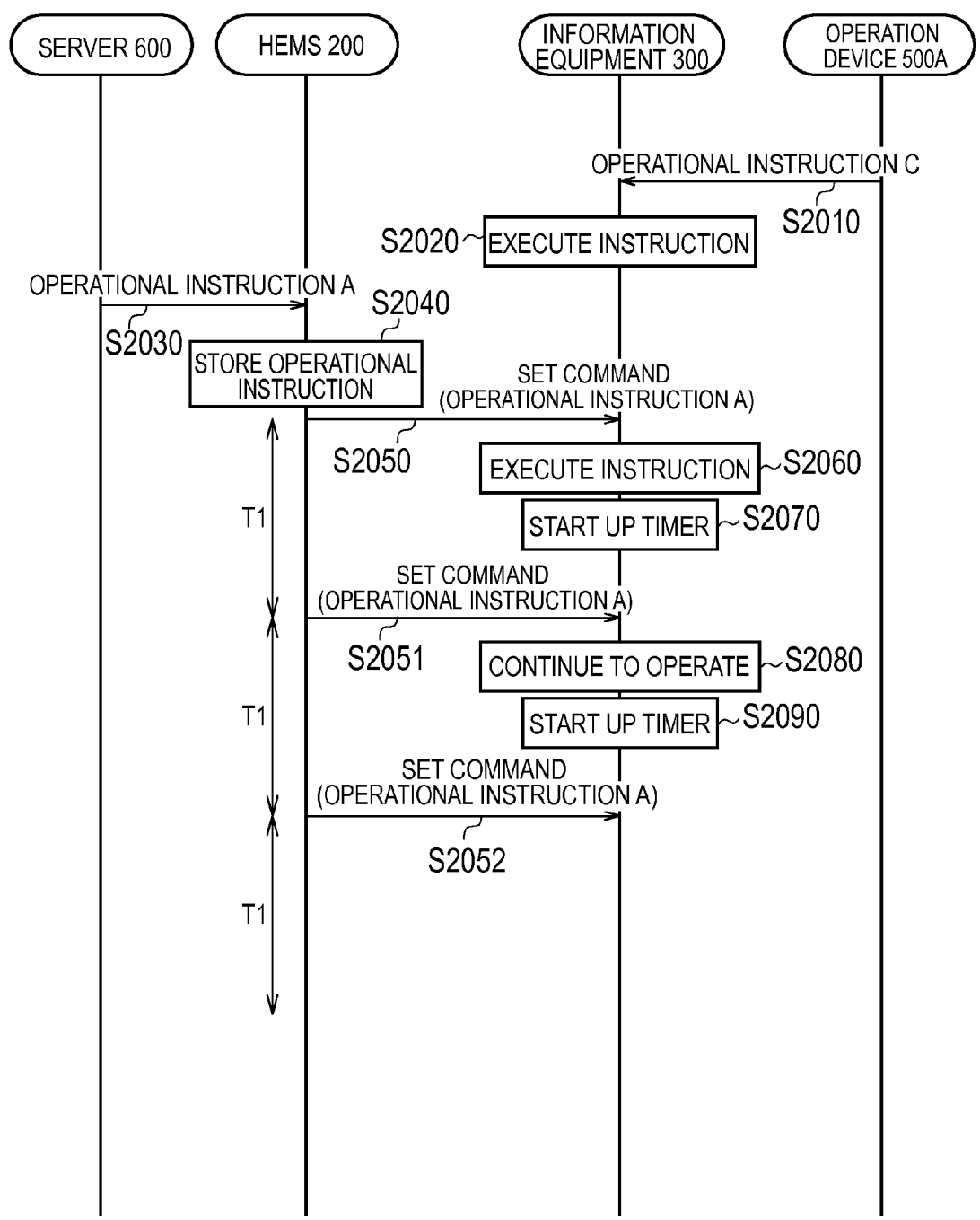

CONTROL SYSTEM, CONTROL APPARATUS, INFORMATION EQUIPMENT, AND CONTROL METHOD

TECHNICAL FIELD

The prevent invention relates to a control system installed in a consumer's facility, a control apparatus, information equipment, and a control method.

BACKGROUND ART

In recent years, a control system (EMS: energy management system) controlling a plurality of pieces of information equipment has drawn attention (for example, Patent Literature 1). In such a control system, a control apparatus controlling the plurality of pieces of information equipment is installed.

As a control apparatus, there is an HEMS (home energy management system) located in a house, a BEMS (building energy management system) located in a building, an FEMS (factory energy management system) located in a factory, an SEMS (store energy management system) located in a store, a CEMS (cluster/community energy management system) located in units of a community, or the like. The control apparatus transmits an operational instruction of instructing an operation of the information equipment through a network connecting the control apparatus and the information equipment to the information equipment.

As the plurality of pieces of information equipment, there are a distributed power apparatus, a power storage apparatus, a thermal storage apparatus, and a load. The distributed power apparatus is an apparatus generating power by using natural energy such as solar light, wind power, or geothermal power like a solar cell or the like. Otherwise, the distributed power apparatus is an apparatus generating power by using fuel gas like a fuel cell such as an SOFC (solid oxide fuel cell). The power storage apparatus is an apparatus storing power like a secondary battery or the like. The thermal storage apparatus is an apparatus converting power to heat and storing the heat like a water heater or the like. The load is a refrigerator, an illuminator, an air conditioner, a TV, or the like.

CITATION LIST

Patent Literature

Patent Literature 1: Japanese application publication No. 2010-128810

SUMMARY OF INVENTION

With the spread of operation terminals such as a smartphone, there is a demand for performing remote control of the information equipment by using the operation terminal at an outside of the consumer's facility (house, building, factory, store, or the like) where the information equipment is located.

The present invention is to provide a control system, a control apparatus, information equipment, and a control method capable of performing operation of information equipment by considering various demands.

A control system according to a first aspect comprises information equipment located in a consumer's facility and a control apparatus controlling the information equipment via a network which connects the information equipment and the control apparatus. The control apparatus includes a transmission unit which repetitively transmits to the information equipment an operational instruction of instructing an operation of the information equipment until transmission of an instruction different from the operational instruction is determined.

In the first aspect, the information equipment includes a reception unit configured to receive the operational instruction and a control unit configured to control operation of the information equipment. In a case where the information equipment operates according to the operational instruction received from the control apparatus, if the reception unit receives the operational instruction from the control apparatus, the control unit allows the information equipment to continue to operate according to the operational instruction.

In the first aspect, in a case where the operational instruction is a remote instruction transmitted from an operation terminal different from the control apparatus to the control apparatus via a public communication network and the information equipment operates according to the operational instruction, the transmission unit performs repetitive transmission of the operational instruction.

In the first aspect, the control unit measures an elapsed time from a time when the reception unit receives the operational instruction, in a case where the reception unit receives the operational instruction before the elapsed time reaches a predetermined period defined according to a transmission period of the operational instruction, the control unit resets the elapsed time, and in a case where the elapsed time exceeds the predetermined period, the control unit allows the control-unit's own information equipment to perform a predetermined operation.

In the first aspect, in a case where the reception unit receives an operational instruction transmitted from an operation terminal different from the control apparatus without passing through the control apparatus, the control unit stops measuring the elapsed time.

In the first aspect, the information equipment further includes a notification unit configured to notify the control apparatus that the control unit stops measuring the elapsed time.

In the first aspect in a case where the information equipment operates according to the operational instruction received from the control apparatus, if the reception unit receives an operational instruction transmitted from an operation terminal different from the control apparatus without passing through the control apparatus, the control unit switches from an operation according to the operational instruction received from the control apparatus to an operation according to the operational instruction transmitted without passing through the control apparatus.

In the first aspect, the control unit further includes a notification unit notifying the control apparatus of information indicating that the operation is switched in a case where the operation is switched by reception of the operational instruction transmitted without passing through the control apparatus.

In the first aspect, when the notification unit notifies the control apparatus of the information indicating that the operation is switched, the notification unit also notifies the control apparatus of information indicating an operation route.

In the first aspect, in a case where the operational instruction is an predetermined instruction, the transmission unit stops repetitive transmission of the operational instruction.

In the first aspect, the information equipment and the control apparatus communicate with each other in a method in accordance with ECHONET Lite.

In the first aspect, the transmission unit includes the operational instruction in a set command specified in the ECHONET Lite and transmits the set command to the information equipment.

A control apparatus according to a second aspect controlling information equipment located in a consumer's facility via a network which connects the information equipment and the control apparatus. The control apparatus comprises a transmission unit configured to transmit to the information equipment an operational instruction of instructing an operation of the information equipment, and in a case where the information equipment operates according to the operational instruction transmitted by the transmission unit, the transmission unit repetitively transmits the operational instruction until an instruction different from the operational instruction is transmitted.

In the second aspect, in a case where the operational instruction is a remote instruction transmitted from an operation terminal different from the control apparatus to the control apparatus via a public communication network and the information equipment operates according to the operational instruction, the transmission unit performs repetitive transmission of the operational instruction.

Information equipment according to a third aspect is located in a consumer's facility and is controlled by a control apparatus via a network which connects the control apparatus and the information equipment. The information equipment comprises a reception unit configured to receive an operational instruction of instructing an operation of the information equipment; and a control unit configured to control an operation of the control-unit's own information equipment. In a case where the information equipment operates according to the operational instruction received from the control apparatus, if the reception unit receives the operational instruction from the control apparatus, the control unit allows the control-unit's own information equipment to continue to operate according to the operational instruction.

A control method according to a fourth aspect is used in a control system including information equipment located in a consumer's facility and a control apparatus controlling the information equipment via a network which connects the information equipment and the control apparatus. The control method comprises a step of performing repetitive transmission of an operational instruction of instructing an operation of the information equipment from the control apparatus to the information equipment until an instruction different from the operational instruction is transmitted.

BRIEF DESCRIPTION OF THE DRAWINGS

FIGS. 6(A) and 6(B) are diagrams illustrating an example of a message format according to the first embodiment.

FIGS. 7(A) and 7(B) are diagrams illustrating an example of the message format according to the first embodiment.

FIG. 8 is a diagram illustrating an example of the message format according to the first embodiment.

FIG. 10 is a sequence diagram illustrating the control method according to the first embodiment.

FIG. 11 is a sequence diagram illustrating the control method according to the first embodiment.

DESCRIPTION OF EMBODIMENTS

Figure 1:
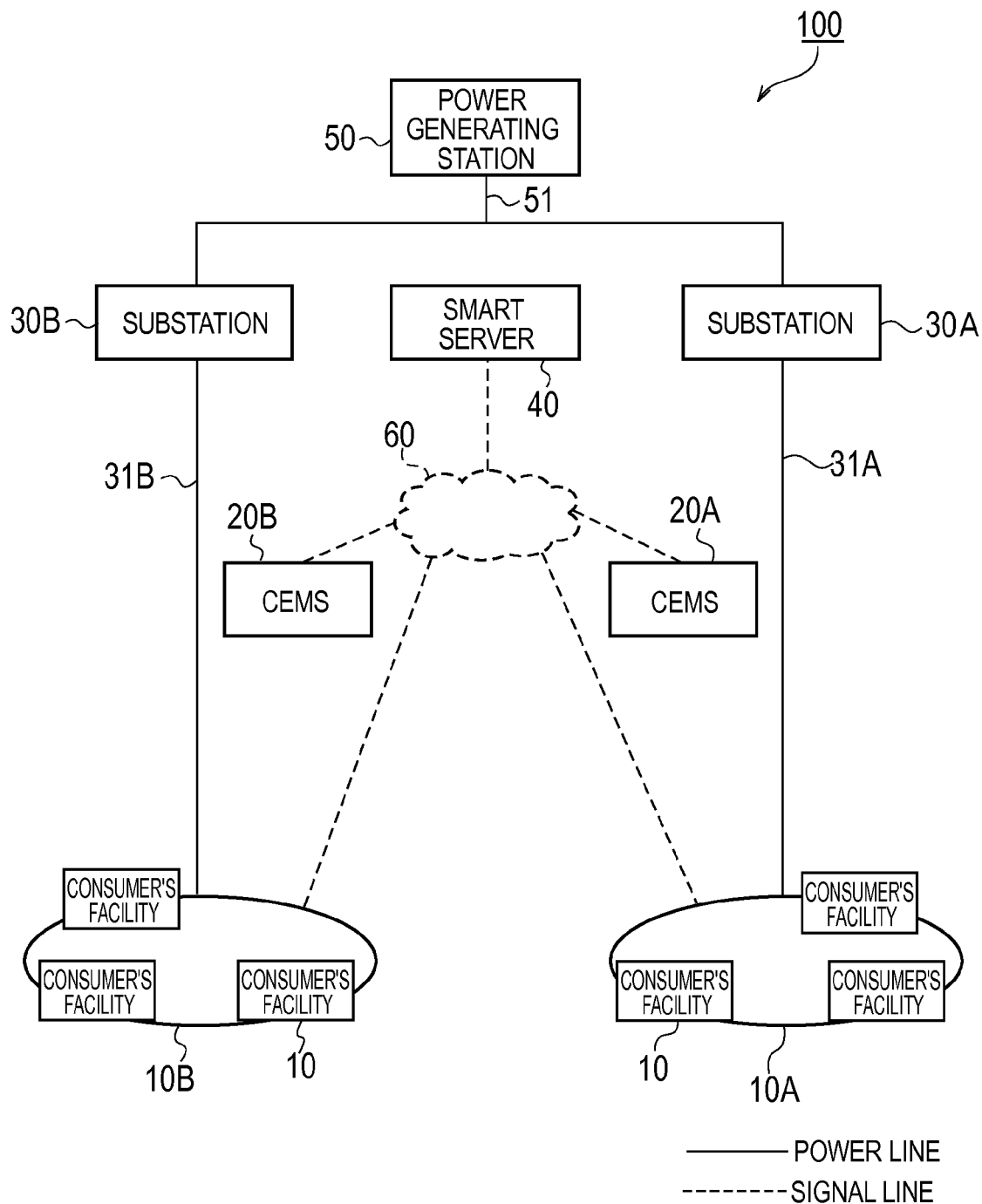
FIG. 1 is a diagram illustrating a control system according to a first embodiment.

Hereinafter, a control system according to an embodiment of the present invention will be described with reference to the drawings. In addition, in the description of the drawings hereinafter, the same or similar components will be denoted by the same or similar reference numerals.

However, it should be noted that the drawings are schematically illustrated, and thus, the ratio of dimensions or the like are different from actual ones. Therefore, specific dimensions should be determined in consideration of the following description. In addition, among the figures, components having different dimension relations or ratios are also included.

Outline of Embodiment

A control system according to embodiment comprises information equipment located in a consumer's facility and a control apparatus controlling the information equipment via a network which connects the information equipment and the control apparatus. The control apparatus includes a transmission unit which repetitively transmits to the information equipment an operational instruction of instructing an operation of the information equipment until transmission of an instruction different from the operational instruction is determined.

In the embodiment, the control apparatus includes a transmission unit which repetitively transmits to the information equipment an operational instruction of instructing an operation of the information equipment until transmission of an instruction different from the operational instruction is determined. Therefore, it is capable of remotely controlling the information equipment in view of a problem such as a security aspect.

First Embodiment (Control System)

Hereinafter, a control system according to a first embodiment will be described. FIG. 1 is a diagram illustrating the control system 100 according to the first embodiment.

As illustrated in FIG. 1, the control system 100 is configured to include a consumer's facility 10, a CEMS 20, a substation 30, a smart server 40, and a power plant 50. The consumer's facility 10, the CEMS 20, the substation 30, and the smart server 40 are connected to each other via the wide area network 60.

The consumer's facility 10 is an example of the consumer's facility including at least one of a distributed power apparatus, a power storage apparatus, a thermal storage apparatus, and a load. The distributed power apparatus, the power storage apparatus, the thermal storage apparatus, and the load are an example of the information equipment controlled by the control apparatus.

The distributed power apparatus is an apparatus generating power by using natural energy such as solar light, wind power, or geothermal power like a solar cell or the like. Otherwise, the distributed power apparatus is an apparatus generating power by using fuel gas like a fuel cell. The power storage apparatus is an apparatus storing power, for example, like a secondary battery or the like. The thermal storage apparatus is an apparatus converting power to heat and storing the heat, for example, like a water heater or the like. The load is a refrigerator, an illuminator, an air conditioner, a TV, or the like.

The consumer's facility 10 may be, for example, a detached residence, may be a housing complex such as an apartment house, may be a commercial facility such as a building, may be a factory, or may be a store.

In the first embodiment, a consumer's facility group 10A and a consumer's facility group 10B are configured with a plurality of the consumer's facilities 10. The consumer's facility group 10A and the consumer's facility group 10B are classified, for example, according to a geographical area.

The CEMS 20 controls connection between the plurality of the consumer's facilities 10 and a power grid. Since the CEMS 20 manages the plurality of the consumer's facilities 10, the CEMS is sometimes referred to as a CEMS (cluster energy management system). More specifically, during a power failure or the like, the CEMS 20 disconnects the connection between the plurality of the consumer's facilities 10 and the power grid. On the other hand, at the restoration of power or the like, the CEMS 20 connects the plurality of the consumer's facilities 10 and the power grid.

In the first embodiment, a CEMS 20A and a CEMS 20B are installed. The CEMS 20A controls, for example, the connection between the consumer's facilities 10 included in the consumer's facility group 10A and the power grid. The CEMS 20B controls, for example, the connection between the consumer's facilities 10 included in the consumer's facility group 10B and the power grid.

The substation 30 supplies power to the plurality of the consumer's facilities 10 through a distribution line 31. More specifically, the substation 30 steps down a voltage supplied from the power plant 50.

In the first embodiment, a substation 30A and a substation 30B are installed. The substation 30A supplies power, for example, to the consumer's facilities 10 included in the consumer's facility group 10A through a distribution line 31A. The substation 30B supplies power, for example, to the consumer's facilities 10 included in the consumer's facility group 10B through a distribution line 31B.

The smart server 40 manages the plurality of the CEMSs 20 (here, the CEMS 20A and the CEMS 20B). The smart server 40 manages the plurality of the substations 30 (here, the substation 30A and the substation 30B). In other words, the smart server 40 collectively manages the consumer's facilities 10 included in the consumer's facility group 10A and the consumer's facility group 10B. The smart server 40 has a function of balancing, for example, the power supplied to the consumer's facility group 10A and the power supplied to the consumer's facility group 10B.

The power plant 50 performs power generation using firepower, wind power, hydropower, nuclear power, or the like. The power plant 50 supplies power to the plurality of the substations 30 (here, the substation 30A and the substation 30B) through a power transmission line 51.

The wide area network 60 is connected to each apparatus via a signal line. The wide area network 60 is, for example, the Internet, a wide area circuit network, a narrow area circuit network, a mobile phone network, or the like.

(Consumer's Facility)

Figure 2:
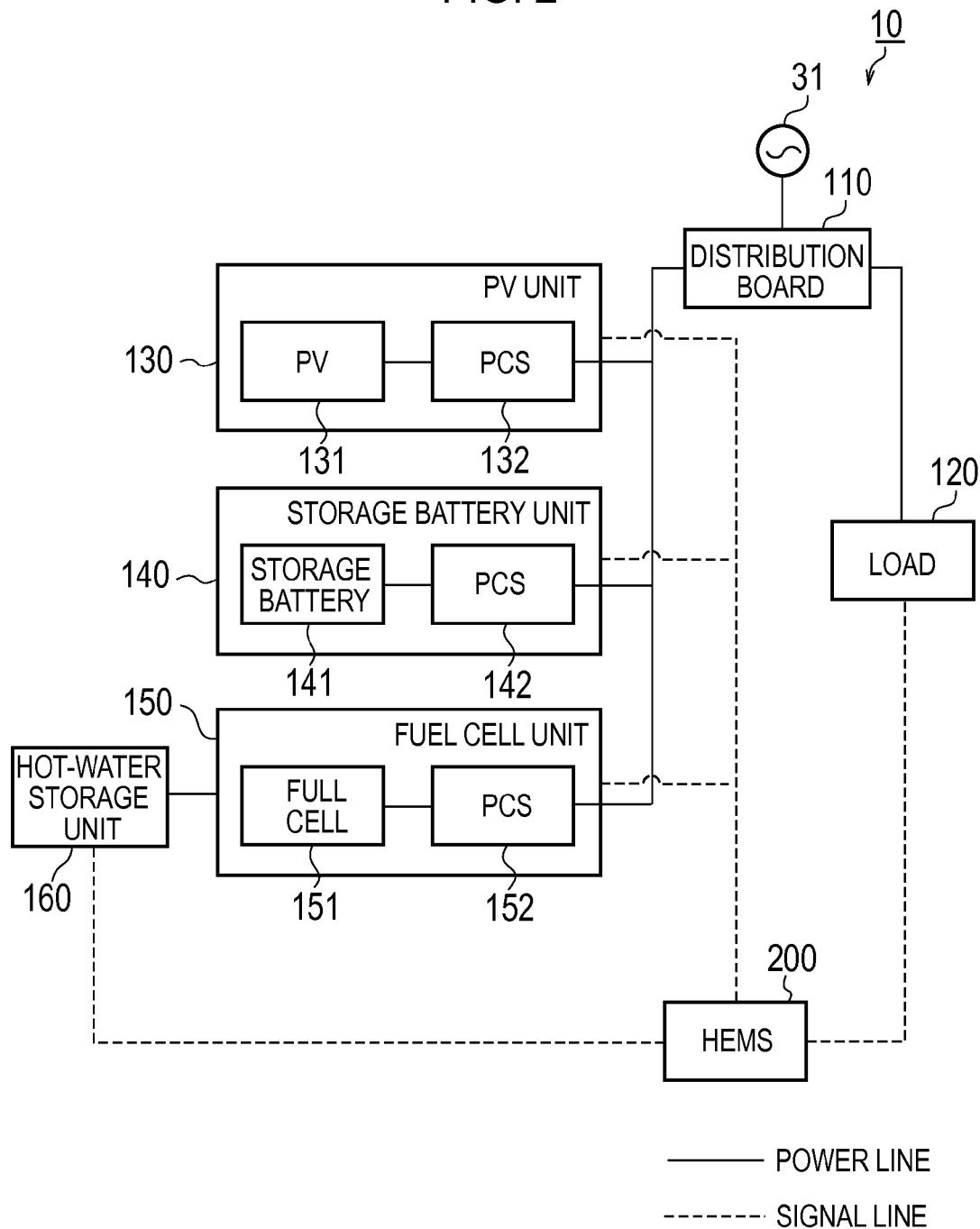
FIG. 2 is a diagram illustrating details of a consumer's facility according to the first embodiment.

Hereinafter, the consumer's facility according to the first embodiment will be described. FIG. 2 is a diagram illustrating details of the consumer's facility 10 according to the first embodiment.

As illustrated in FIG. 2, the consumer's facility 10 is configured to include a distribution board 110, a load 120, a PV unit 130, a storage battery unit 140, a fuel cell unit 150, a hot-water storage unit 160, and an HEMS 200.

The distribution board 110 is connected to the distribution line 31 (grid). The distribution board 110 is connected to the load 120, the PV unit 130, the storage battery unit 140, and the fuel cell unit 150 through a power line.

The distribution board 110 may include a measurement unit measuring the power supplied from the distribution line 31 (grid). The measurement unit may measure power consumption of the load 120.

The load 120 is an apparatus consuming the power supplied through the power line. For example, the load 120 includes an apparatus such as a refrigerator, an illuminator, an air conditioner, or a TV. The load 120 may include a single apparatus or a plurality of apparatuses.

The PV unit 130 includes a PV 131 and a PCS 132. The PV 131 is an example of the distributed power apparatus and is an apparatus performing power generation according to reception of solar light. The PV 131 outputs a DC power as a result of the power generation. An amount of power generation of the PV 131 is changed according to an amount of solar radiation with which the PV 131 is irradiated. The PCS 132 is an apparatus (power conditioning system) converting the DC power output from the PV 131 to an AC power. The PCS 132 outputs the AC power to the distribution board 110 through the power line.

In the first embodiment, the PV unit 130 may include a pyrheliometer measuring the amount of solar radiation with which the PV 131 is irradiated.

The PV unit 130 is controlled by an MPPT (maximum power point tracking) method. More specifically, the PV unit 130 optimizes an operating point (point determined by a voltage value and a power value at the operating point or point determined by a voltage value and a current value at the operating point) of the PV 131.

The storage battery unit 140 is configured to include a storage battery 141 and a PCS 142. The storage battery 141 is an apparatus storing power. The PCS 142 is an apparatus (power conditioning system) converting a DC power output from the storage battery 141 to an AC power.

The fuel cell unit 150 is configured to include a fuel cell 151 and a PCS 152. The fuel cell 151 is an example of the distributed power apparatus and is an apparatus generating power by using a fuel gas. The PCS 152 is an apparatus (power conditioning system) converting a DC power output from the fuel cell 151 to an AC power.

The fuel cell unit 150 operates according to load-following control. More specifically, the fuel cell unit 150 controls the fuel cell 151 so that the power output from the fuel cell 151 follows the power consumption of the load 120.

The hot-water storage unit 160 is an example of the thermal storage apparatus converting power to heat and storing the heat. More specifically, the hot-water storage unit 160 includes a hot-water storage tank to warm water supplied from the hot-water storage tank by exhaust heat generated from operation (power generation) of the fuel cell 151. More specifically, the hot-water storage unit 160 warms the water supplied from the hot-water storage tank and returns the warm water to the hot-water storage tank.

The HEMS 200 is a control apparatus managing the information equipment (load, distributed power apparatus, power storage apparatus or thermal storage apparatus) located in the consumer's facility 10.

In the first embodiment, the HEMS 200 is connected to the PV unit 130, the storage battery unit 140, the fuel cell unit 150, and the hot-water storage unit 160 through the signal line and controls the PV unit 130, the storage battery unit 140, the fuel cell unit 150, and the hot-water storage unit 160. The HEMS 200 may control power consumption of the load 120 by controlling an operation mode of the load 120. The signal line connecting the HEMS 200 and the information equipment may be in a wireless or may be in a wired manner.

The HEMS 200 is connected to various servers via the wide area network 60. The various servers store, for example, information (hereinafter, referred to as energy fee information) such as a purchase unit price of the power supplied from the grid, a sale unit price of the power supplied from the grid, and a purchase unit price of the fuel gas.

In addition, the various servers store, for example, information (hereinafter, referred to as energy consumption forecasting information) for forecasting power consumption of the load 120. The energy consumption forecasting information may be generated, for example, based on actual records of the previous power consumption of the load 120. The energy consumption forecasting information may be a model of the power consumption of the load 120.

The various servers store, for example, information (hereinafter, referred to as PV power generation amount forecast information) for forecasting the amount of power generation of the PV 131. The PV power generation forecast information may be a forecast value of the amount of solar radiation with which the PV 131 is irradiated. Alternatively, the PV power generation forecast information may be weather forecast, season, daylight hours, or the like.

(Applicable Scene)

Figure 3:
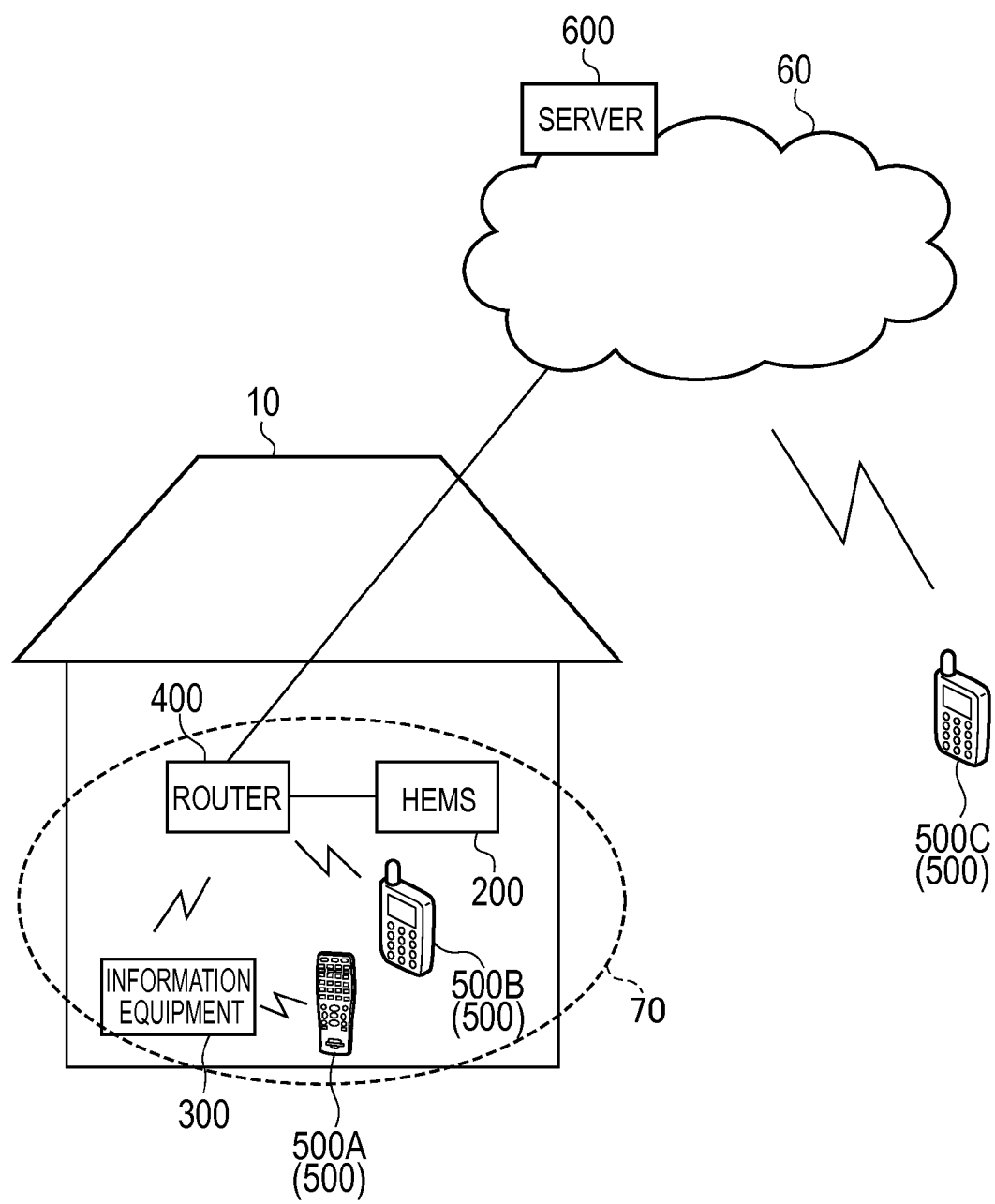
FIG. 3 is a diagram illustrating an applicable scene according to the first embodiment.

Hereinafter, an applicable scene of the first embodiment will be described. FIG. 3 is a diagram illustrating the applicable scene of the first embodiment.

As illustrated in FIG. 3, a system according to the applicable scene of the first embodiment is configured to include an HEMS 200, information equipment 300, a router 400, an operation terminal 500, and a server 600.

The HEMS 200 is an example of the control apparatus managing the information equipment 300 located in the consumer's facility 10. The HEMS 200 is connected to the router 400 in a wired or wireless manner and communicates with the information equipment 300, the operation terminal 500, and the server 600 through the router 400.

The information equipment 300 is controlled by the HEMS 200 like the load 120, the PV unit 130, the storage battery unit 140, the fuel cell unit 150, the hot-water storage unit 160, or the like.

The router 400 constitutes a narrow area network 70 (local area communication network or personal area network) installed in the consumer's facility 10. The router 400 may constitute a wireless LAN or a wired LAN as the narrow area network 70. FIG. 3 exemplarily illustrates the case where the HEMS 200 is connected to the router 400 in a wired manner and the information equipment 300 and the operation terminal 500 are connected to the router 400 in a wireless manner. However, the HEMS 200 may be connected to the router 400 in a wireless manner, and the information equipment 300 and the operation terminal 500 may be connected to the router 400 in a wired manner.

The operation terminal 500 is an operation terminal transmitting an operational instruction for the information equipment 300. The operation terminal 500 may be an operation terminal (for example, a remote controller or an operation button installed in the information equipment 300) directly inputting operation into the information equipment 300 without use the router 400 or the HEMS 200. Alternatively, the operation terminal 500 may be an operation terminal (for example, a mobile terminal connected to the router 400 in a wireless manner or a personal computer connected to the router 400 in a wired manner) connected to the narrow area network 70. The operation terminal connected the narrow area network 70 indirectly inputs operation to the information equipment 300 through the router 400 and the HEMS 200. In addition, the operation terminal 500 may be an operation terminal (for example, a mobile terminal capable of accessing the server 600 or a personal computer capable of accessing the server 600) connected to a wide area network 60 (global area network or wide area network) different from the narrow area network 70. The operation terminal connected to the wide area network 60 is not limited to an apparatus carried by a user, but it may be a server (for example, a server managed by a power company) installed on the wide area network 60. As the operational instruction transmitted from such a server, there is considered a demand response or the like.

In FIG. 3, as the operation terminal 500, an operation terminal 500A directly inputting operation into the information equipment 300, an operation terminal 500B connected to the narrow area network 70, and an operation terminal 500C connected to the wide area network 60 are exemplarily illustrated. In a case where the operational instruction is a demand response or the like, it should be noted that the operation terminal 500C may be considered to be same as the server 600.

The server 600 is a server which is installed on the wide area network 60 and receives operational instruction for the information equipment 300 from the operation terminal 500C connected to the wide area network 60. However, it should be noted that the operation terminal 500C is not always connected to the server 600.

Here, in terms of security, it is not preferable that session between the HEMS 200 connected to the narrow area network 70 installed in the consumer's facility 10 and the server 600 be always retained. In general, in order to protect an apparatus connected to the narrow area network 70, a firewall is installed between the wide area network 60 and the narrow area network 70. Therefore, access from the server 600 to the HEMS 200 cannot be arbitrarily performed. From such a point of view, it is preferable that the server 600 transmit the operational instruction received from the operation terminal 500C to the HEMS 200 according to a query periodically executed by the HEMS 200 with respect to the server 600.

However, the embodiment is not limited thereto. For example, port releasing is performed on the firewall, so that the server 600 may transmit to the HEMS 200 the operational instruction received from the operation terminal 500C at an arbitrary timing.

(Control Apparatus)

Figure 4:
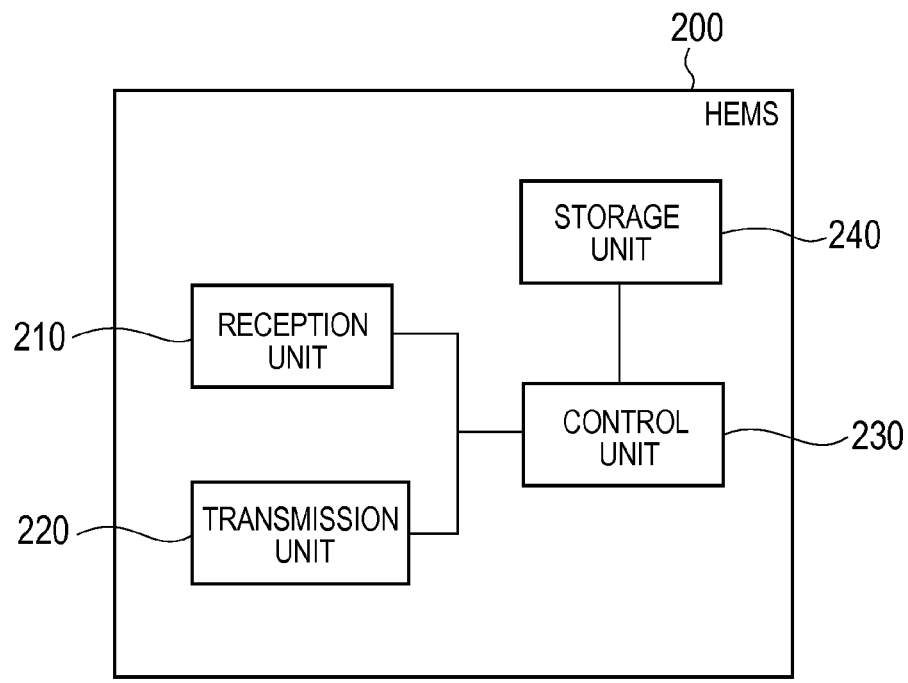
FIG. 4 is a block diagram illustrating an HEMS according to the first embodiment.

Hereinafter, the control apparatus according to the first embodiment will be described. FIG. 4 is a block diagram illustrating the HEMS 200 according to the first embodiment.

As illustrated in FIG. 4, the HEMS 200 is configured to include a reception unit 210, a transmission unit 220, a control unit 230, and a storage unit 240.

The reception unit 210 receives various signals from the apparatuses connected through the signal line (wireless or wired). For example, the reception unit 210 receives information indicating an amount of power generation of the PV 131 from the PV unit 130. The reception unit 210 receives information indicating an amount of electricity storage of the storage battery 141 from the storage battery unit 140. The reception unit 210 receives information indicating an amount of power generation of the fuel cell 151 from the fuel cell unit 150. The reception unit 210 receives information indicating an amount of hot water storage of the hot-water storage unit 160 from the hot-water storage unit 160.

In a case where communication between the HEMS 200 and the information equipment 300 is performed in an ECHONET Lite protocol, the reception unit 210 receives a message (SET response command, GET response command, and INFO command) in accordance with the ECHONET Lite protocol from each apparatus. The SET response command is a response command with respect to a set command (SET command) including an operational instruction for the information equipment 300 and includes a set response indicating a result of the setting (refer to FIGS. 6(A) and 6(B) described later). The GET response command is a response command with respect to a request command (GET command) demanding to refer to information indicating a state of the information equipment 300 and includes information (state information) which is demanded to refer to (refer to FIGS. 7(A) and 7(B) described later). The INFO command is a command which the information equipment 300 spontaneously transmits independently of a command from the HEMS 200 with respect to the information equipment 300 and includes the state information indicating the state of the information equipment 300 (refer to FIG. 8 described later).

Here, the reception unit 210 may receive the energy fee information, the energy consumption forecasting information, and the PV power generation amount forecast information from various servers via the wide area network 60. However, the energy fee information, the energy consumption forecasting information, and the PV power generation amount forecast information may be stored in the HEMS 200 in advance.

In the first embodiment, the reception unit 210 receives the operational instruction (inside-consumer's-facility operation) from the operation terminal 500B. In addition, the reception unit 210 receives the operational instruction (outside-consumer's-facility operation) received from the operation terminal 500C from the server 600.

The transmission unit 220 transmits various signals to apparatuses connected through the signal line. For example, the transmission unit 220 transmits signals for controlling the load 120, the PV unit 130, the storage battery unit 140, the fuel cell unit 150 and the hot-water storage unit 160 to the respective apparatuses.

In a case where communication between the HEMS 200 and the information equipment 300 is performed in an ECHONET Lite protocol, the transmission unit 220 transmits a message (SET command and GET command) in accordance with the ECHONET Lite protocol to each apparatus. The SET command is a set command including an operational instruction for the information equipment 300 (refer to FIG. 6(A) described later). The GET command is a request command demanding to refer to information indicating a state of the information equipment 300 (refer to FIG. 7(A) described later).

In the first embodiment, the transmission unit 220 transmits a query of the operational instruction received from the operation terminal 500C to the server 600.

In the first embodiment, the transmission unit 220 transmits an operational instruction of instructing an operation of the information equipment 300 to the information equipment 300. The operational instruction is any one of the later-described operational instructions generated by the control unit 230, an instruction input by inside-consumer's-facility operation from the operation terminal 500B connected to the narrow area network 70 or an instruction input by outside-consumer's-facility operation from the operation terminal 500C connected to the wide area network 60.

The transmission unit 220 transmits the operational instruction to the information equipment 300 so that the transmission source (that is, HEMS 200, operation terminal 500B, or operation terminal 500C) of the operational instruction can be distinguished. In a case where communication between the HEMS 200 and the information equipment 300 is performed in an ECHONET Lite protocol, for example, the transmission unit 220 transmits a message obtained by allowing the operational instruction and operation route specifying information for distinguishing the transmission source of the operational instruction to be included in the existing message (SET command) of the ECHONET Lite protocol. The operation route specifying information may be, for example, a 1-bit flag.

Returning to FIG. 4, the control unit 230 controls operations of the HEMS 200. The control unit 230 controls the load 120, the PV unit 130, the storage battery unit 140, the fuel cell unit 150, and the hot-water storage unit 160.

In the first embodiment, the control unit 230 controls operations of the information equipment 300. More specifically, the control unit 230 generates an operational instruction for the information equipment 300 and transmits the operational instruction to the information equipment 300 through the transmission unit 220.

In the first embodiment, in a case where the operational instruction is not an operational instruction generated by the control unit 230 but an operational instruction received from another equipment, the control unit 230 determines a route type (transmission source) of the operational instruction. More specifically, in a case where the operational instruction does not pass through the server 600 installed on the wide area network 60, the control unit 230 determines that the route type is the inside-consumer's-facility operation. On the other hand, in a case where the operational instruction passes through the server 600 installed on the wide area network 60, the control unit 230 determines that the route type is the outside-consumer's-facility operation.

As described above, in a case where the route type is the inside-consumer's-facility operation, the operational instruction is transmitted from the operation terminal 500B to the HEMS 200 through the router 400. Therefore, if the control unit identifies the IP address of the transmission source of the operational instruction, the control unit 230 can determine that the operational instruction does not pass through the server 600. On the other hand, in a case where the route type is the outside-consumer's-facility operation, the operational instruction which the server 600 receives from the operation terminal 500C is transmitted from the server 600 to the HEMS 200. Therefore, if the control unit identifies the IP address of the transmission source of the operational instruction, the control unit 230 can determine that the operational instruction passes through the server 600.

The storage unit 240 stores information required by the control unit 230 to control the load 120, the PV unit 130, the storage battery unit 140, the fuel cell unit 150, and the hot-water storage unit 160. In addition, the storage unit 240 stores information required to control and manage the equipment 300.

In the first embodiment, the storage unit 240 stores the operational instruction with respect to the equipment 300. The storage unit 240 stores the route type (transmission source) of the operational instruction in association with the operational instruction with respect to the equipment 300.

(Information Equipment)

Figure 5:
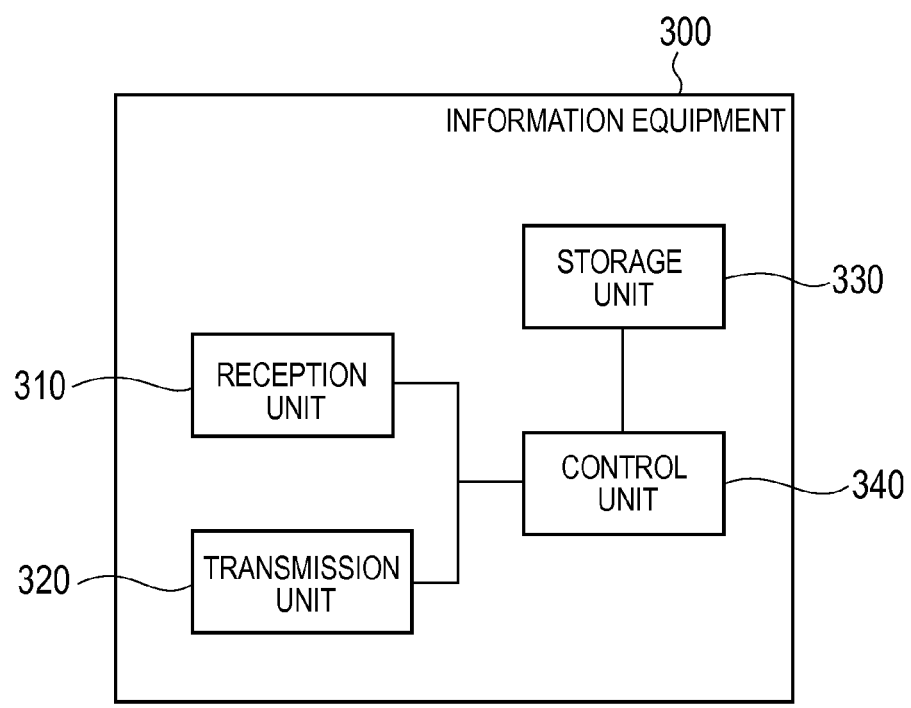
FIG. 5 is a block diagram illustrating information equipment according to the first embodiment.

Hereinafter, the information equipment according to the first embodiment will be described. FIG. 5 is a block diagram illustrating the information equipment 300 according to the first embodiment.

As illustrated in FIG. 5, the information equipment 300 is configured to include a reception unit 310, a transmission unit 320, a storage unit 330, and a control unit 340.

The reception unit 310 receives various signals from the apparatuses connected through the signal line (wireless or wired). More specifically, the reception unit 310 receives an operational instruction from the operation terminal 500A or the HEMS 200. The operational instruction from the HEMS 200 includes an operational instruction from the operation terminal 500B or the operation terminal 500C as well as an operational instruction generated by the HEMS 200 (control unit 230).

In a case where communication between the HEMS 200 and the information equipment 300 is performed in an ECHONET Lite protocol, the reception unit 310 receives a message (SET command and GET command) in accordance with the ECHONET Lite protocol from the HEMS 200.

In the first embodiment, the reception unit 310 receives an operational instruction of instructing an operation of the information equipment. In a case where communication between the HEMS 200 and the information equipment 300 is performed in an ECHONET Lite protocol, the reception unit 310 receives a set command (SET command) including the operational instruction from the HEMS 200. In addition, the reception unit 310 receives an operational instruction from the operation terminal 500A through infrared ray or the like.

The transmission unit 320 transmits various signals to apparatuses connected through the signal line (wireless or wired).

In a case where communication between the HEMS 200 and the information equipment 300 is performed in an ECHONET Lite protocol, the transmission unit 320 transmits a message (SET response command, GET response command, and INFO command) in accordance with the ECHONET Lite protocol to the HEMS 200.

More specifically, according to the reception of the set command including an operational instruction for the information equipment 300, the transmission unit 320 notifies the HEMS 200 of an operation-route identifier indicating a route type of the operational instruction included in the set command. For example, as illustrated in FIG. 6(B), according to the reception of the SET command, the transmission unit 320 transmits to the HEMS 200 a SET response command including the operation-route identifier indicating the route type of the operational instruction included in the SET command.

Otherwise, according to the reception of the request command demanding to refer to information indicating a state of the information equipment 300, the transmission unit 320 notifies the HEMS 200 of an operation-route identifier indicating a route type of the operational instruction received before the reception of the request command. For example, as illustrated in FIG. 7(B), according to the reception of the GET command, the transmission unit 320 transmits to the HEMS 200 a GET response command including the operation-route identifier indicating the route type of the operational instruction received before the reception of the GET command. Namely, the transmission unit 320 transmits to the HEMS 200 the GET response command including the operation-route identifier indicating which operation route the current operation is received from.

Otherwise, in a case where the later-described variable stored in the storage unit 330 is changed, the transmission unit 320 notifies the HEMS 200 of an operation-route identifier indicating a changed variable. For example, as illustrated in FIG. 10, the transmission unit 320 transmits to the HEMS 200 an INFO command including the operation-route identifier indicating the changed variable.

In the first embodiment, the transmission unit 320 constitutes a notification unit notifying the HEMS 200 of the operation-route identifier (will be described later). Details thereof will be described later.

The storage unit 330 stores variables indicating the route type of the operational instruction for the information equipment 300.

As described above, the variables indicating the route type of the operational instruction for the information equipment 300 include a variable indicating operation of setting the HEMS 200 as the transmission source, a variable indicating inside-consumer's-facility operation where the operation terminal 500B connected to the narrow area network 70 installed in the consumer's facility 10 inputs operation to the information equipment 300 and a variable indicating outside-consumer's-facility operation where the operation terminal 500C connected to a wide area network 60 different from the narrow area network 70 inputs operation to the information equipment 300.

In addition, the variable indicating the inside-consumer's-facility operation may include a variable indicating direct operation where operation is directly input to the information equipment 300 without passing through a different apparatus (for example, HEMS 200 or router 400) and a variable indicating indirect operation where operation is indirectly input to the information equipment 300 through a different apparatus (for example, HEMS 200 or router 400).

The direct operation may be operation of operation buttons installed in the information equipment 300 or may be operation using a remote controller associated with the information equipment 300. The indirect operation is operation using the operation terminal 500B connected to the narrow area network 70 installed in the consumer's facility 10.

The control unit 340 controls operations of the information equipment 300. More specifically, the control unit 340 controls the operations of the information equipment 300 according to an operational instruction received from the HEMS 200 or the operation terminal 500A. The operational instruction received from the HEMS 200 may be an operational instruction generated by the HEMS 200, may be an operational instruction according to inside-consumer's-facility operation from the operation terminal 500B, or may be an operational instruction according to outside-consumer's-facility operation from the operation terminal 500C.

In the first embodiment, the control unit 340 determines an operational instruction route type. The control unit 340 can specify any one of the operation by the HEMS 200, the inside-consumer's-facility operation, and the outside-consumer's-facility operation according to operation route specifying information included in a message including the operational instruction. In addition, since the control unit 340 can specify the direct operation, the control unit 340 can specify operation other than the direct operation. Therefore, the control unit 340 can specify that the inside-consumer's-facility operation is direct operation and can specify that the inside-consumer's-facility operation is indirect operation.

(Repetitive Transmission of SET Command)

Hereinafter, in a case where the information equipment 300 operates according to the operational instruction transmitted from the HEMS 200, repetitive transmission of the SET command will be described. Here, the case where communication between the HEMS 200 and the information equipment 300 is performed in accordance with the ECHONET Lite protocol is exemplified.

In the first embodiment, the HEMS 200 (transmission unit 220) repetitively transmits to the information equipment 300 the operational instruction of instructing an operation of the information equipment 300 until a different instruction needs to be transmitted. More specifically, the transmission unit 220 transmits a set command (SET command) including an operational instruction A to the information equipment 300.

The information equipment 300 operates according to the operational instruction A included in the SET command. More specifically, the reception unit 310 receives the SET command, and the control unit 340 controls the operations of the information equipment 300 according to the operational instruction A included in the SET command.

While the information equipment 300 operates according to the operational instruction A, the HEMS 200 repetitively transmits the set command including the operational instruction A to the information equipment 300. The repetitive transmission of the set command including the operational instruction A continues to be performed until it is determined that the HEMS 200 transmits to the information equipment 300 an operational instruction B different from the operational instruction A.

In a case where the information equipment 300 operates according to the operational instruction A received from the HEMS 200, if the reception unit 310 receives the operational instruction A repetitively transmitted from the HEMS 200, the control unit 340 allows the information equipment 300 to continue to operates according to the operational instruction A.

In addition, in a case where the information equipment 300 operates according to the operational instruction A input by inside-consumer's-facility operation from the operation terminal 500B, an operator may also directly operate the information equipment 300 in the vicinity of the information equipment 300 if needed. In a case where the operational instruction A is an instruction transmitted to the HEMS 200 by inside-consumer's-facility operation from the operation terminal 500B, the transmission unit 220 may stop the repetitive transmission of the operational instruction A.

In addition, in a case where the operational instruction is a predetermined instruction, the transmission unit 220 may stop the repetitive transmission of the SET command. The predetermined operation is, for example, an operation of stop, stand-by, or the like by which the safety of the apparatus is secured. Even in that case where the narrow area network 70 is disrupted and the information equipment 300 cannot be controlled by the HEMS 200, if the information equipment 300 stops the operation according to the operational instruction A (for example, operation stop instruction), there is little concern about the safety. Therefore, the transmission unit 200 can stop the repetitive transmission of the operational instruction A.

In the first embodiment, the control unit 340 measures an elapsed time from the time when the reception unit 310 receives the operational instruction A. More specifically, at the time of receiving the operational instruction A, the control unit 340 starts up a timer to measure the elapsed time. The control unit 340 sets a defined predetermined period as an expiration time of the timer according to a transmission period T1 of the operational instruction A. The predetermined period is preferably longer than, for example, the transmission period T1.

In a case where the reception unit 310 receives the operational instruction A again by the expiration time of the timer, the control unit 340 resets the timer.

On the other hand, in a case where the reception unit 310 reaches the expiration of the timer without receiving the operational instruction A again, the control unit 340 allows the control-unit's own equipment to perform a predetermined operation. The predetermined operation is, for example, proceeding to a stand-by state or turning off the power. Therefore, for example, even in a case where the operational instruction from the HEMS 200 cannot be received due to disruption of the narrow area network 70 or the like, the control unit 340 secures the safety of the information equipment 300 to the utmost.

Next, in a case where the information equipment 300 operates according to the operational instruction transmitted from the HEMS 200, the case where the information equipment 300 receives an operational instruction (so-called, a direct operational instruction) transmitted without passing through the HEMS 200 will be described.

In the first embodiment, in a case where the reception unit 310 receives an operational instruction (operational instruction C) transmitted from the operation terminal 500A without passing through the HEMS 200, the measurement of the elapsed time is stopped.

In a case where the information equipment 300 operates according to the operational instruction A received from the HEMS 200, if the reception unit 310 receives the operational instruction C from the operation terminal 500A, the control unit 340 gives priority to the operational instruction C which is direct operation and allows the information equipment 300 to operates according to the operational instruction C. At this time, the control unit 340 stops the timer.

In a case where the control unit 340 stops the measurement of the elapsed time, the transmission unit 320 transmits to the HEMS 200 information indicating an operation state of the information equipment 300 and an INFO command including the later-described operation-route identifier. Therefore, the HEMS 200 recognizes that information equipment 300 switches to an operation according to an operational instruction according to a different operation route, and the repetitive transmission of the SET command is stopped.

(Control Method)

Figure 9:
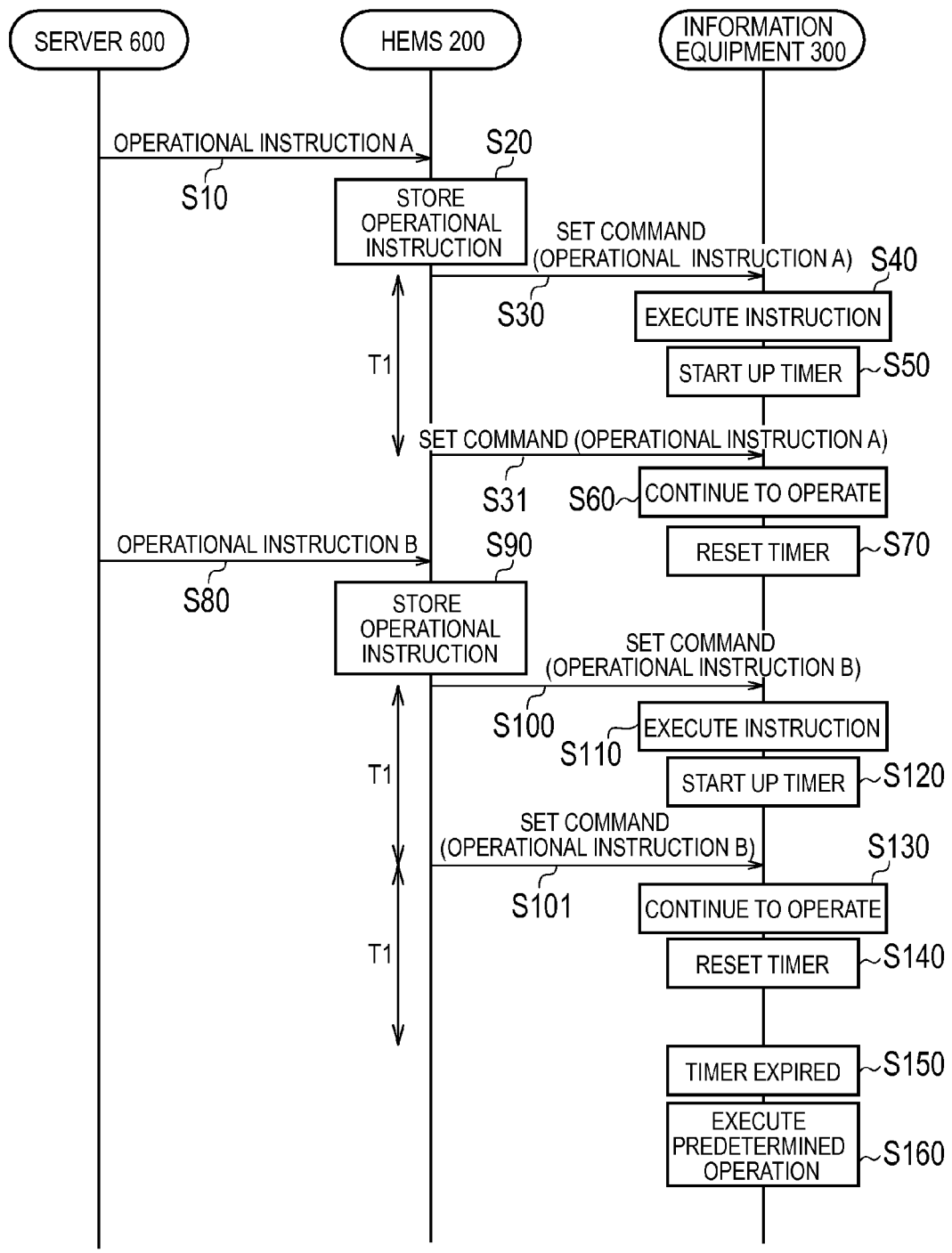
FIG. 9 is a sequence diagram illustrating a control method according to the first embodiment.

Hereinafter, a control method according to the first embodiment will be described. FIGS. 9 to 11 are sequence diagrams illustrating the control method according to the first embodiment. In FIGS. 9 to 11, the case where communication between the HEMS 200 and the information equipment 300 is performed in accordance with the ECHONET Lite protocol is exemplified.

FIG. 9 is a sequence diagram illustrating a case where the information equipment 300 operates according to an operational instruction A and an operational instruction B received from the HEMS 200.

In step S10, the server 600 transmits the operational instruction A to the HEMS 200. The operational instruction A may be an operational instruction such as a demand response generated by the server 600 or may be an outside-consumer's-facility operational instruction which the server 600 receives from the operation terminal 500C via the wide area network 60.

In step S20, the HEMS 200 stores the operational instruction A.

In step S30, the HEMS 200 generates a SET command including the operational instruction A and transmits the SET command to the information equipment 300. In addition, the HEMS 200 periodically repetitively transmits the SET command including the operational instruction A to the information equipment 300 (step S31). In FIG. 9, only step S31 as the first repetitive transmission is illustrated, and the following repetitive transmissions are omitted. However, it should be noted that the SET command including the operational instruction A are repetitively transmitted at a transmission period T1 in step S32, S33, . . . .

In step S40, the information equipment 300 executes the operational instruction A (for example, turning on the power, or the like) included in the received SET command. Namely, the information equipment 300 operates according to the operational instruction A. Here, it should be noted that the information equipment 300 transmits the SET response command responding to the SET command to the HEMS 200. At this time, the information equipment 300 starts up a timer to measure an elapsed time from the time of receiving the SET command in step S30 (step S50).

On the other hand, if the information equipment receives the SET command during the operation of the timer, the information equipment 300 identifies the operational instruction included in the received SET command. Next, in a case where the information equipment identifies that the operational instruction is the same as the currently-executed operational instruction A, the information equipment continues to perform the operation according to the operational instruction A (step S60). At this time, the information equipment 300 resets the timer (step S70). After that, in a case where the information equipment receives the SET command which is the same as the operational instruction A, steps S60 and S70 are repeated, and the operation according to the operational instruction A continues to be performed in the meantime.

Subsequently, the case where the operational instruction B is transmitted from the server 600 to the HEMS 200 will be described (step S80).

In step S90, the HEMS 200 stores the operational instruction B.

In step S100, the HEMS 200 generates a SET command including the operational instruction B and transmits the SET command to the information equipment 300.

Similarly to step S31 or the like, the HEMS 200 repetitively transmits the SET command including the operational instruction B to the information equipment 300 (step S101). In FIG. 9, only step S101 as the first repetitive transmission is illustrated, and the following repetitive transmissions are omitted. However, it should be noted that the SET command including the operational instruction B are repetitively transmitted with a transmission period T1 in step S102, S103, . . . .

On the other hand, the information equipment 300 identifies the operational instruction B included in the received SET command. Next, if the information equipment identifies the operational instruction B different from the currently-executed operational instruction A, the information equipment executes the operational instruction B (step S110). Namely, the information equipment 300 operates according to the operational instruction B. Here, it should be noted that the information equipment 300 transmits the SET response command responding to the SET command to the HEMS 200.

In addition, at this time, the information equipment 300 starts up a timer (step S120). However, since the timer is started up before step S120, it should be noted that, in step S120, the same process as the resetting of the timer is performed.

After that, the information equipment 300 receives the SET command transmitted in step S101 or the like, and if the information equipment identifies that the operational instruction included in the received SET command is the same as the currently-executed operational instruction B, the information equipment continues to perform the operation according to the operational instruction B (step S130). In addition, at each time, the information equipment 300 resets the timer (step S140).

After that, if the elapsed time measured by the timer without receiving the SET command exceeds a predetermined period (for example, a time length longer than the transmission period T1) defined according to the transmission period T1, the information equipment 300 determines that there was disruption in a route between the information equipment 300 and the server 600 (step S150).

In step S160, the information equipment 300 performs predetermined operation (for example, operation stop) at the expiration time of the timer.

Here, in a case where the operational instruction A is an operational instruction generated by the HEMS 200 or in a case where the operational instruction A is an operational instruction transmitted from the operation terminal 500B to the HEMS 200 via the narrow area network 70, the process of step S10 is not performed. The same description as above is applied to the process of step S80 where the server 600 transmits the operational instruction B to the HEMS 200.

In addition, in the processes of step SS31 . . . where the repetitive transmission of the SET command including the operational instruction A is performed, the case where the operational instruction A is an operational instruction (inside-consumer's-facility operational instruction) transmitted from the operation terminal 500B to the HEMS 200 via the narrow area network 70 may be omitted. The same description as above is applied to the processes of step S101 . . . where the repetitive transmission of the SET command including the operational instruction B is performed.

FIG. 10 is a sequence diagram of the case where the information equipment 300 receives the operational instruction C from the operation terminal 500A when the information equipment operates according to the operational instruction A received from the HEMS 200.

In step S1010, the server 600 transmits the operational instruction A to the HEMS 200. The operational instruction A may be an operational instruction such as a demand response generated by the server 600 or may be an outside-consumer's-facility operational instruction which the server 600 receives from the operation terminal 500C via the wide area network 60.

In step S1020, the HEMS 200 stores the operational instruction A.

In step S1030, the HEMS 200 generates a SET command including the operational instruction A and transmits the SET command to the information equipment 300. In addition, the HEMS 200 periodically repetitively transmits the SET command including the operational instruction A to the information equipment 300 (step S1031). In FIG. 10, only step S1031 as the first repetitive transmission is illustrated, and the following repetitive transmissions are omitted. However, it should be noted that the SET command including the operational instruction A are repetitively transmitted at a transmission period T1 in step S1032, S1033, . . . .

In step S1040, the information equipment 300 executes the operational instruction A (for example, turning on the power, or the like) included in the received SET command. Namely, the information equipment 300 operates according to the operational instruction A. Here, it should be noted that the information equipment 300 transmits the SET response command responding to the SET command to the HEMS 200. At this time, the information equipment 300 starts up a timer to measure an elapsed time from the time of receiving the SET command in step S1030 (step S1050).

On the other hand, if the information equipment receives the SET command during the operation of the timer, the information equipment 300 identifies that the operational instruction included in the SET command received in step S1031 is the currently-executed operational instruction A. Next, in a case where the information equipment identifies that the operational instruction is the same as the currently-executed operational instruction A, the information equipment continues to perform the operation according to the operational instruction A (step S1060). At this time, the information equipment 300 resets the timer (step S1070).

Next, the case where the operational instruction C is transmitted from the operation terminal 500A to the information equipment 300 will be described (step S1080).

In step S1090, the information equipment 300 executes the operational instruction C. Namely, the information equipment 300 operates according to the operational instruction C. At this time, the information equipment 300 stops the timer (step S1100). In addition, the information equipment 300 transmits to the HEMS 200 an INFO command including information indicating the stop of the timer or a variable (property or the like of an ECHONET apparatus object) indicating a state of the operation changed based on the operational instruction C and an operation-route identifier indicating that an immediately previous operational instruction is transmitted by the operation terminal 500A (step S1110).

Here, it should be noted that, in FIGS. 9 and 10, since the operational instruction A and the operational instruction B are SET commands from the HEMS 200, the operational instruction A and the operational instruction B include operation-route identifiers. On the other hand, when the information equipment receives the operational instruction C in step S1080, since the operational instruction C is not a SET command and does not include an operation-route identifier, the information equipment 300 can determine that the operational instruction is not an instruction from the HEMS 200 but a direct instruction.

Therefore, at the time of transmitting the INFO command to the HEMS 200 in step S1110, the information equipment 300 generates an operation-route identifier indicating that the operational instruction is a direct instruction other than an instruction from the HEMS 200, allows the operation-route identifier to be included in the INFO command, and transmits the INFO command including the operation-route identifier. Therefore, the HEMS 200 or the operation terminal 500B connected to the narrow area network 70 can recognize that the information equipment 300 switches to operation according to direct operation from the operation terminal 500A.

Furthermore, by receiving the INFO command from the information equipment 300, the HEMS 200 determines that the timer of the information equipment 300 is stopped and does not perform re-transmit a SET command including the following operational instructions A. Therefore, the highest priority is given to the direct operation generated later, so that competition of the SET command re-transmitted from the HEMS 200 can be avoided.

FIG. 11 is a sequence diagram of the case where the information equipment 300 receives the operational instruction C from the operation terminal 500A when the information equipment operates according to the operational instruction A received from the HEMS 200.

In step S2010, the operation terminal 500A transmits the operational instruction C to the information equipment 300.

In step S2020, the information equipment 300 executes the operational instruction C. Namely, the information equipment 300 operates according to the operational instruction C.

In step S2030, the server 600 transmits the operational instruction A to the HEMS 200. The operational instruction A may be an operational instruction such as a demand response generated by the server 600 or may be an outside-consumer's-facility operational instruction which the server 600 receives from the operation terminal 500C via the wide area network 60.

In step S2040, the HEMS 200 stores the operational instruction A.

In step S2050, the HEMS 200 generates a SET command including the operational instruction A and transmits the SET command to the information equipment 300. In addition, the HEMS 200 periodically repetitively transmits the SET command including the operational instruction A to the information equipment 300 (step S2051). In FIG. 11, only the steps S2051 and S2052 as the first and second repetitive transmissions are illustrated, and the following steps are omitted. However, it should be noted that the SET command including the operational instruction A is repetitively transmitted at a transmission period T1 in step S2053, S2054, . . . .

In step S2060, the information equipment 300 executes the operational instruction A included in the received SET command. Namely, the information equipment 300 operates according to the operational instruction A. Here, it should be noted that the information equipment 300 transmits the SET response command responding to the SET command to the HEMS 200. In addition, at this time, preferably, the switching of the operation by the operational instruction transmitted from the HEMS 200 is displayed on a display unit installed in the information equipment 300 or sound alarm is performed.

In addition, if the information equipment receives the SET command in step S2060, the information equipment 300 starts up a timer to measure an elapsed time from the time of receiving the SET command (step S2070).

On the other hand, if the information equipment receives the SET command during the operation of the timer, the information equipment 300 identifies the operational instruction included in the SET command received in step S2051. Next, in a case where the information equipment identifies that the operational instruction is the same as the currently-executed operational instruction A, the information equipment continues to perform the operation according to the operational instruction A (step S2080). At this time, the information equipment 300 resets the timer (step S2090). Hereinafter, the same processes as FIG. 9 continue to be performed.

Other Embodiments

While the invention has been described with reference to the above embodiments, it should not be understood that the description and the drawings as a portion of the disclosure limit the invention. It will be apparent to the ordinarily skilled in the art that various alternative embodiments, examples, and operational techniques are available from the disclosure.

In the embodiments, the ECHONET Lite was exemplified as predetermined communication protocol. However, the embodiments are not limited thereto, but communication protocol (for example, ZigBee (registered trademark), KNX, or the like) other than the ECHONET Lite may be used as the predetermined communication protocol. Otherwise, a combination of the ECHONET Lite and different communication protocol may be used as the predetermined communication protocol.

In the embodiments, three types of inside-consumer's-facility operation (direct operation), inside-consumer's-facility operation (indirect operation), and outside-consumer's-facility operation were exemplified as operational instruction route types. However, the embodiments are not limited thereto. Two types of inside-consumer's-facility operation and outside-consumer's-facility operation may be used as the operational instruction route types. Otherwise, the route type of the operational instruction may be operation other than the direct operation and the direct operation.

In the embodiments, the information equipment 300 specifies the inside-consumer's-facility operation and the outside-consumer's-facility operation according to a difference in a format between messages including operational instructions. However, the embodiments are not limited thereto. The information equipment 300 may specify the inside-consumer's-facility operation and the outside-consumer's-facility operation by identifying IP addresses of transmission sources.

In the embodiments, the case where the control apparatus is the HEMS 200 was exemplified. However, the embodiments are not limited thereto. The control apparatus may be installed in the CEMS 20 or may be installed in the smart server 40. Otherwise, the control apparatus may be installed in a BEMS (building energy management system), may be installed in an FEMS (factory energy management system), or may be installed in an SEMS (store energy management system).

In the embodiment, the consumer's facility 10 is configured to include a load 120, a PV unit 130, a storage battery unit 140, a fuel cell unit 150, and a hot-water storage unit 160. However, the consumer's facility 10 may include any one of the load 120, the PV unit 130, the storage battery unit 140, the fuel cell unit 150, and the hot-water storage unit 160.

In addition, the entire contents of Japanese Patent Application No. 2013-84414 filed in the Japanese Patent Office on Apr. 12, 2013 are incorporated into the specification of the present invention by reference.

INDUSTRIAL APPLICABILITY

As described heretofore, according to the present invention, it is possible to provide information equipment, a control apparatus, a control system, and a control method capable of performing operation of information equipment by considering various demands.

The invention claimed is:

1. A control system comprising:
   information equipment located in a consumer's facility; and
   a control apparatus controlling the information equipment via a network which connects the information equipment and the control apparatus, wherein
   the control apparatus includes a transmitter configured to repetitively transmit to the information equipment an operational instruction of instructing an operation of the information equipment until transmission of an instruction different from the operational instruction is determined.

2. The control system according to claim 1, wherein the information equipment includes:
   a receiver configured to receive the operational instruction; and
   a controller configured to control operation of the information equipment, and
   in a case where the information equipment operates according to the operational instruction received from the control apparatus, if the receiver receives the operational instruction from the control apparatus, the controller allows the information equipment to continue to operate according to the operational instruction.

3. The control system according to claim 2, wherein,
   in a case where the operational instruction is a remote instruction transmitted from an operation terminal different from the control apparatus to the control apparatus via a public communication network and the information equipment operates according to the operational instruction, the transmitter performs repetitive transmission of the operational instruction.

4. The control system according to claim 2, wherein
   the controller measures an elapsed time from a time when the receiver receives the operational instruction,
   in a case where the receiver receives the operational instruction before the elapsed time reaches a predetermined period defined according to a transmission period of the operational instruction, the controller resets the elapsed time, and
   in a case where the elapsed time exceeds the predetermined period, the controller allows the control-unit's own information equipment to perform a predetermined operation.

5. The control system according to claim 4, wherein,
   in a case where the receiver receives an operational instruction transmitted from an operation terminal different from the control apparatus without passing through the control apparatus, the controller stops measuring the elapsed time.

6. The control system according to claim 5, wherein
   the information equipment further includes a notifier configured to notify the control apparatus that the controller stops measuring the elapsed time.

7. The control system according to claim 2, wherein
   in a case where the information equipment operates according to the operational instruction received from the control apparatus, if the receiver receives an operational instruction transmitted from an operation terminal different from the control apparatus without passing through the control apparatus, the controller switches from an operation according to the operational instruction received from the control apparatus to an operation according to the operational instruction transmitted without passing through the control apparatus.

8. The control system according to claim 7, wherein
   the controller further includes a notifier notifying the control apparatus of information indicating that the operation is switched in a case where the operation is switched by reception of the operational instruction transmitted without passing through the control apparatus.

9. The control system according to claim 8, wherein when the notifier notifies the control apparatus of the information indicating that the operation is switched, the notifier also notifies the control apparatus of information indicating an operation route.

10. The control system according to claim 1, wherein in a case where the operational instruction is a predetermined instruction, the transmitter stops repetitive transmission of the operational instruction.

11. The control system according to claim 1, wherein the information equipment and the control apparatus communicate with each other in a method in accordance with ECHONET Lite.

12. The control system according to claim 11, wherein the transmitter includes the operational instruction in a set command specified in the ECHONET Lite and transmits the set command to the information equipment.

13. A control apparatus controlling information equipment located in a consumer's facility via a network which connects the information equipment and the control apparatus, wherein
the control apparatus comprises a transmitter configured to transmit to the information equipment an operational instruction of instructing an operation of the information equipment, and
in a case where the information equipment operates according to the operational instruction transmitted by the transmitter, the transmitter repetitively transmits the operational instruction until an instruction different from the operational instruction is transmitted.

14. The control apparatus according to claim 13, wherein in a case where the operational instruction is a remote instruction transmitted from an operation terminal different from the control apparatus to the control apparatus via a public communication network and the information equipment operates according to the operational instruction, the transmitter performs repetitive transmission of the operational instruction.

15. Information equipment which is located in a consumer's facility and is controlled by a control apparatus via a network which connects the control apparatus and the information equipment, the information equipment comprising:
a receiver configured to receive an operational instruction of instructing an operation of the information equipment; and
a controller configured to control an operation of the control-unit's own information equipment, wherein,
the controller continues the operation according to the operational instruction, if the receiver receives the operational instruction repeatedly from the control apparatus and the operational instruction is an instruction of a remote control via a public communication network.

16. A control method used in a control system including information equipment located in a consumer's facility and a control apparatus controlling the information equipment via a network which connects the information equipment and the control apparatus, the control method comprising:
a step of performing repetitive transmission of an operational instruction of instructing an operation of the information equipment from the control apparatus to the information equipment until an instruction different from the operational instruction is transmitted.

* * * * *